UNITED STATES PATENT OFFICE.

MYRTIL KAHN, OF ELBERFELD, GERMANY, ASSIGNOR TO FARBENFABRIKEN OF ELBERFELD CO., OF NEW YORK, N. Y., A CORPORATION OF NEW YORK.

BLACK AZO DYE.

SPECIFICATION forming part of Letters Patent No. 725,848, dated April 21, 1903.

Application filed January 27, 1903. Serial No. 140,721. (No specimens.)

*To all whom it may concern:*

Be it known that I, MYRTIL KAHN, doctor of philosophy, chemist, residing at Elberfeld, Germany, (assignor to the FARBENFABRIKEN OF ELBERFELD CO., of New York,) have invented a new and useful Improvement in Azo Dyes; and I do hereby declare the following to be an exact and clear description of my invention.

My invention relates to the production of new and valuable azo dyestuffs by combining the diazo compounds of nitro-ortho-amidophenol monosulfonic acids having the formula:

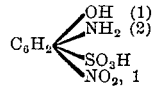

such as ortho-amidophenol-ortho-nitro-parasulfonic acid, ortho-amidophenol-para-nitro-ortho-sulfonic acid, or the like—with 1:5 dioxynaphthalene. The new azo dyestuffs thus obtained are brownish-black powders soluble in water with a violet color turning blue on adding a small quantity of caustic-soda lye, dyeing wool from acid-bath bluish-violet shades turning black by a subsequent treatment with chromium compounds reacting as oxidizing agents. The black shades thus obtained possess a great fastness to the "potting process," which is a finishing process for woolen piece goods. In this process the goods are entered into boiling water and allowed to remain there until the water is cold. The goods thus assume a high degree of gloss and softness, and according to the effect desired the potting may be repeated several times.

In carrying out my process practically I can proceed as follows, the parts being by weight: 23.5 parts of ortho-amidophenol-ortho-nitro-para-sulfonic acid having the formula:

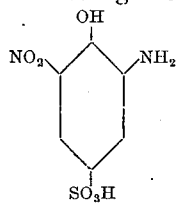

are diazotized in the usual manner, and the resulting diazo compound is stirred into a mixture of sixteen parts of 1:5-dioxynaphthalene with ice-water. Caustic-soda lye is added until the mixture is alkaline. The dioxynaphthalene enters into solution, and the formation of the dyestuff begins. After being stirred for some time the excess of caustic-soda lye is neutralized by means of hydrochloric acid, and the new dyestuff is precipitated by the addition of common salt, filtered off, and dried.

The new coloring-matter thus obtained is in the shape of the sodium salt, when dry and pulverized a brownish-black powder soluble in water to a violet solution and soluble in concentrated sulfuric acid of 66° Baumé with a greenish-black color, which is changed to violet red on adding ice, a reddish-brown precipitate being obtained. It dyes wool from acid-bath bluish-violet shades. By subsequently treating the dyed fiber with chromium compounds reacting as oxidizing agents—such as chromates, bichromates, or the like—the shades are changed to greenish black distinguished for great fastness to the potting process. They also resist milling and washing and possess a good fastness against the action of light.

Having now described my invention, what I claim is—

1. The herein-described new azo dyestuffs derived from nitro-ortho-amidophenol monosulfonic acids and 1:5 dioxynaphthalene, which, when in a dry state, are brownish-black powders soluble in water with a violet color turning blue on adding a small quantity of caustic-soda lye and dyeing wool from acid-bath bluish-violet shades turning black by a subsequent treatment with chromium compounds reacting as oxidizing agents, substantially as hereinbefore described.

2. The herein-described new azo dyestuff derived from ortho-amidophenol-ortho-nitro-para-sulfonic acid and 1:5-dioxynaphthalene, which, in the shape of the sodium salt, is a brownish-black powder soluble in water with a violet color; soluble in concentrated sulfuric acid of 66° Baumé with a greenish-black color turning violet red by the addition of ice, a reddish-brown precipitate being obtained; dyeing wool from acid-bath bluish-violet shades which are changed to deep black by a subsequent treatment with chromium compounds reacting as oxidizing agents, substantially as described.

In testimony whereof I have signed my name in the presence of two subscribing witnesses.

MYRTIL KAHN.

Witnesses:
OTTO KÖNIG,
J. A. RITTERSHAUS.